(12) United States Patent
Betway

(10) Patent No.: US 7,077,447 B1
(45) Date of Patent: Jul. 18, 2006

(54) METHOD FOR MANUALLY CARRYING A LOAD

(76) Inventor: Dennis O. Betway, 1747 Rose St. #19, La Crosse, WI (US) 54603

( * ) Notice: Subject to any disclaimer, the term of this patent is extended or adjusted under 35 U.S.C. 154(b) by 3 days.

(21) Appl. No.: 10/848,868

(22) Filed: May 18, 2004

(51) Int. Cl.
*A45F 5/00* (2006.01)

(52) U.S. Cl. ........................ 294/152; 294/153; 294/157

(58) Field of Classification Search ................ 294/149, 294/151, 152, 153, 154, 157, 74, 140; 182/93, 182/138, 194, 196, 198, 199; 5/625, 626
See application file for complete search history.

(56) References Cited

U.S. PATENT DOCUMENTS

| | | | | |
|---|---|---|---|---|
| 582,908 | A | * | 5/1897 | Feidt ........................... 254/359 |
| 851,862 | A | * | 4/1907 | Bryant ....................... 182/196 |
| 873,044 | A |   | 12/1907 | Hanson |
| 954,840 | A | * | 4/1910 | Weidemann ................ 294/141 |
| 1,314,397 | A | * | 8/1919 | Heffron ........................ 294/74 |
| 2,366,535 | A | * | 1/1945 | Le Clair ...................... 452/79 |
| 2,508,795 | A |   | 5/1950 | Nielsen |
| D177,201 | S | * | 3/1956 | Wheeler ...................... D3/315 |
| 2,927,329 | A | * | 3/1960 | Johannis ........................ 5/662 |
| 3,033,310 | A | * | 5/1962 | McLeod ..................... 182/196 |
| 3,214,072 | A |   | 10/1965 | Brown |
| 3,486,671 | A | * | 12/1969 | Sanders ...................... 224/576 |
| 3,563,433 | A |   | 2/1971 | Yoshiura |
| 3,659,760 | A | * | 5/1972 | Blood ......................... 224/157 |
| 4,431,226 | A |   | 2/1984 | Weilert |
| 4,846,306 | A | * | 7/1989 | Ventz ......................... 182/196 |
| 4,950,014 | A |   | 8/1990 | Smith |
| 5,102,178 | A |   | 4/1992 | Staats, Jr. |
| 5,466,040 | A | * | 11/1995 | Fainsztein ................ 297/183.6 |
| 5,503,448 | A |   | 4/1996 | Dewey |
| 5,628,380 | A | * | 5/1997 | Matisi ......................... 182/70 |
| 5,688,011 | A |   | 11/1997 | Gulley |
| 5,713,497 | A | * | 2/1998 | Ponczek ..................... 224/157 |
| D404,918 | S | * | 2/1999 | Littler et al. ................. D3/315 |
| 6,039,376 | A | * | 3/2000 | Lopreiato ................... 294/152 |
| 6,508,389 | B1 |   | 1/2003 | Ripoyla et al. |
| 6,641,008 | B1 |   | 11/2003 | Falzone et al. |
| 6,908,131 | B1 | * | 6/2005 | Main et al. ................. 294/150 |

* cited by examiner

*Primary Examiner*—Eileen D. Lillis
*Assistant Examiner*—Michael Lowe
(74) *Attorney, Agent, or Firm*—Robert J. Harter

(57) ABSTRACT

A sling for carrying a load comprises two parallel straps that are interconnected by a series of relatively rigid handles. The sling is placed underneath the load while leaving several handles on either side of the load available for gripping. A person at each end of the sling can then choose a handle that is most comfortable for them. Some of the handles, particularly those underneath the load, help keep the two straps properly spaced apart to maintain a broad, stable base upon which the load is supported. The broad base allows each person to use just one arm for lifting, which leaves their other arm available for steadying the load or for opening doors. With this sling, the two persons can face the same direction as they carry the load.

15 Claims, 5 Drawing Sheets

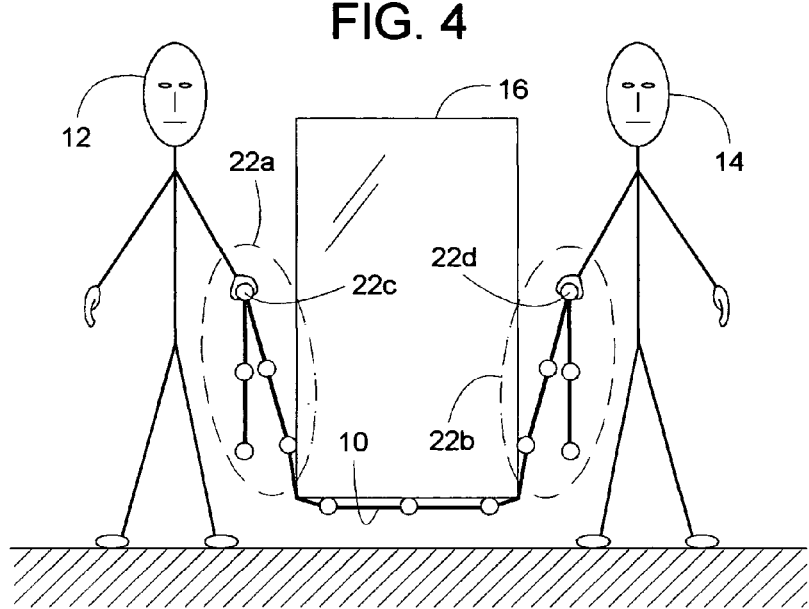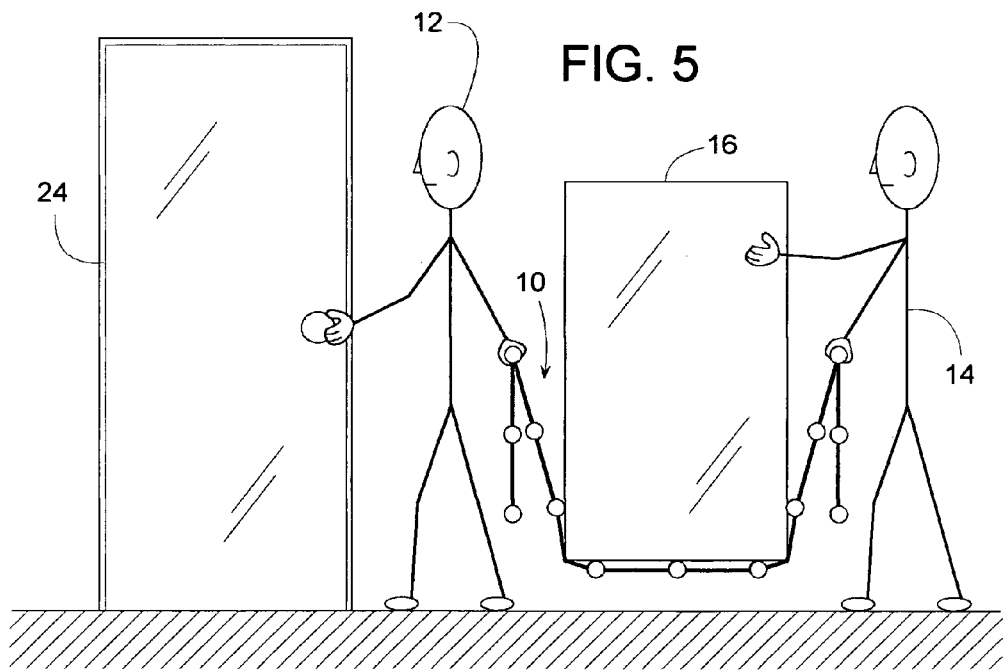

METHOD FOR MANUALLY CARRYING A LOAD

BACKGROUND OF THE INVENTION

1. Field of the Invention

The subject invention generally pertains to a device and method for carrying a load and more specifically to a method that involves a two-person material-handling device.

2. Description of Related Art

Various devices and methods have been developed for manually carrying loads. Examples of such carrying devices are disclosed in U.S. Pat. Nos. 6,508,389; 6,641,008; 6,039,376; 5,688,011; 5,503,448; 5,102,178; 4,950,014; 4,431,226; 3,563,433; 3,214,072; 2,508,795; and 873,044. Although these devices provide various benefits, they also have some drawbacks.

First, in some cases, the carrying device includes two separate straps, thus, if one is misplaced, the device's value may become quite limited. Second, in some cases, both arms of two users are needed for carrying the load, thus no arm is entirely free for opening doors. Third, in some cases, it appears that the two users carrying the load need to face each other, so the one leading the move would need to walk backwards or both users would need to move in a sideways fashion. Either way, movement could be awkward or unsafe. Fourth, in some cases, it appears that the users have to face the load, thus their toes may become pinched underneath the load when it is set back down (see FIG. 4 of U.S. Pat. No. 6,039,376). Fifth, in some cases, if an accident were to occur while moving a load and it becomes necessary to suddenly release the load to free one's self from the carrying straps, it is not clear just how fast a person's arm would release from within a loop of the strap. If the straps, for example, were threaded through an opening of a palletized load, and the load was accidentally dropped over the edge of a ramp or down a staircase, the loops of the strap may not necessarily release from the person's arm as quickly as would be desired.

Consequently, a need exists for an improved device and method for manually moving loads, wherein the device and method overcomes the drawbacks of current devices and methods.

SUMMARY OF THE INVENTION

To provide a more effective method of manually carrying a wide assortment of loads, it is an object of the invention to cradle the load between two users employing a novel sling device.

Another object of some embodiments is to use a sling device that permits at least one of the users to have one arm free for opening doors.

Another object of some embodiments is to allow users to readily point their feet away from the load they are lifting.

Another object of some embodiments is to help steady a load by using a sling that comprises two straps that are held spaced apart by a series of handles interposed therebetween.

Another object of some embodiments is to use a carrying method that employs a sling device that is sufficiently pliable to collapse in a compact shape for storage.

Another object of some embodiments is to use a sling device that in an emergency can be released immediately.

Another object of some embodiments is to use a sling device that is a single, intact assembly so that its component parts are not readily separated and misplaced.

Another object of some embodiments is to use a sling device that allows two users to face and walk in the same direction as they carry a load.

Another object of some embodiments is to use a sling device that comprises a series of handles from which to choose, whereby users can assume a comfortable posture by choosing the most suitable handle.

Another object of some embodiments is to use a sling that comprises two straps and a series of handles, wherein the handles are dual-purpose in that the handles not only provide a means for grabbing the sling but also help hold the straps properly spaced apart.

Another object of some embodiments is to use a sling that is stiffer in one direction than another so that the sling along its length readily conforms around the load, yet the sling can maintain its width.

Another object of some embodiments is to use a sling whose strength is partially achieved by having two continuous straps be contained within slits of a series of handles or relatively stiff cross members.

One or more of these and/or other objects of the invention are provided by a method for manually carrying a load, wherein the method involves the use of a sling that comprises two pliable elongate members that are held spaced apart by a series of relatively rigid handles.

BRIEF DESCRIPTION OF THE DRAWING

FIG. 4 is a front view showing two persons carrying a load, wherein both persons face in the same forward direction.

FIG. 5 is a side view showing two persons carrying a load, wherein both persons face in the same forward direction with one person being farther forward than the load and the load being farther forward than the other person.

DESCRIPTION OF THE PREFERRED EMBODIMENT

Figure 1:
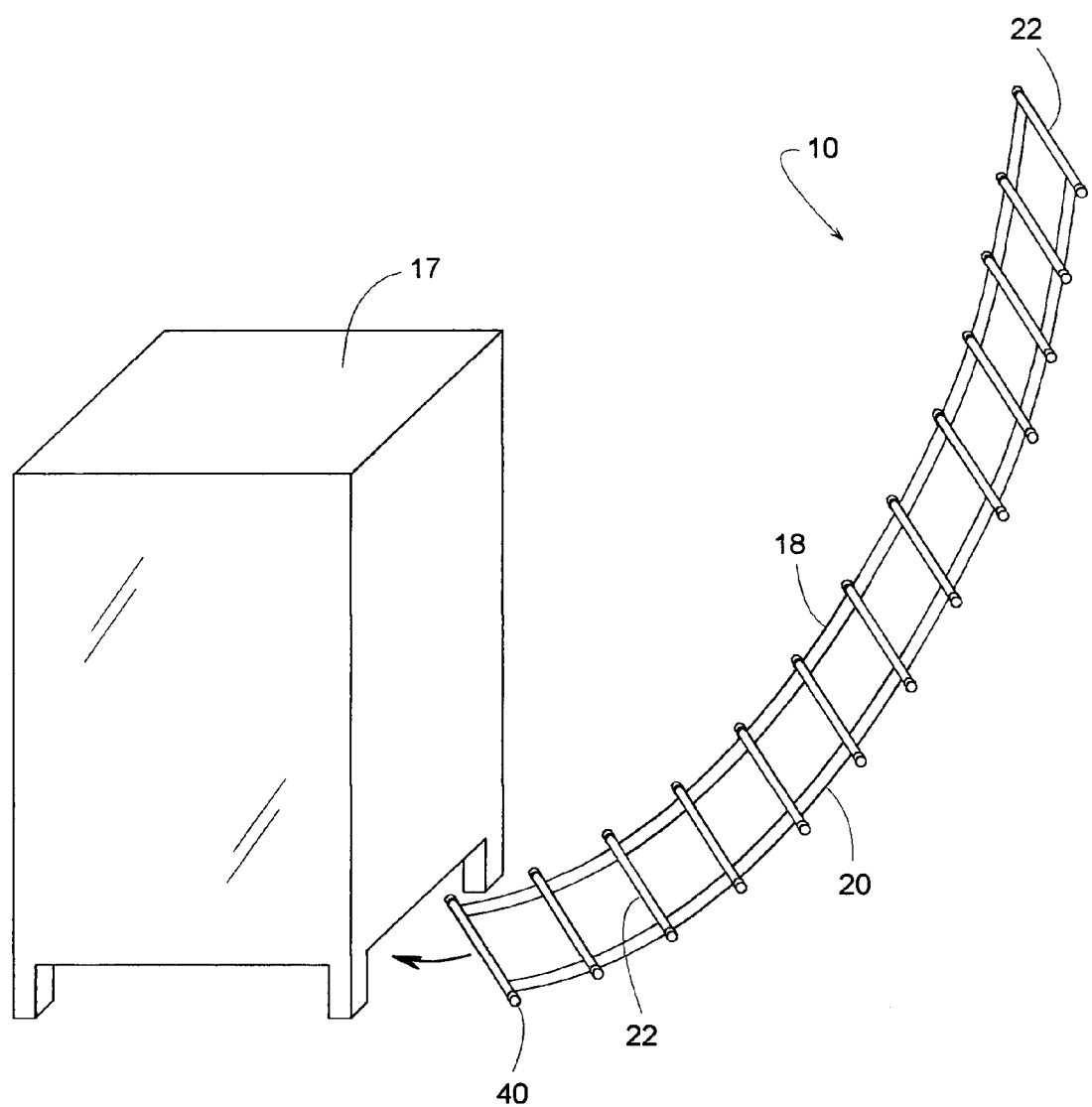
FIG. 1 is a perspective view showing a sling, according to the subject invention, being inserted underneath a load.

FIGS. 1–8 illustrate a novel sling 10 that a first person 12 and a second person 14 can use to manually carrying a load 16 or load 18. The term, "load" refers to any mass, examples of which include, but are not limited to, furniture, freight, cargo, inventory, stock, store supplies, food, machines, equipment, cartons, pallets, boxes, building materials, etc. To ease the task of carrying load 16, sling 10 comprises two pliable elongate members 18 and 20 with a plurality of handles 22 interposed therebetween. Examples of members 18 and 20 include, but are not limited to, a fabric strap (nylon or other material), belt, rope, chain, cable, cord, and various combinations thereof. Members 18 and 20 can be two separate pieces or two sections of a one-piece loop. In some cases, member 18 or 20 could itself be an assembly of multiple pieces.

Handles 22 help hold members 18 and 20 spaced apart from each other and provide a way for persons 12 and 14 to grip sling 10 at a location or height that is most comfortable for them. Each handle 22 can be solid or hollow; can be made of a single piece or multiple pieces; and can have a cross-sectional area that is round, rectangular or any other shape. Although the construction of handles 22 may vary, handles 22 are preferably relatively rigid and stiffer than members 18 and 20. The rigidity of handles 22 helps maintain the desired spacing between members 18 and 20, and the flexibility of members 18 and 20 enable sling 10 to conform to the shape of loads 16 or 18.

Figure 2:
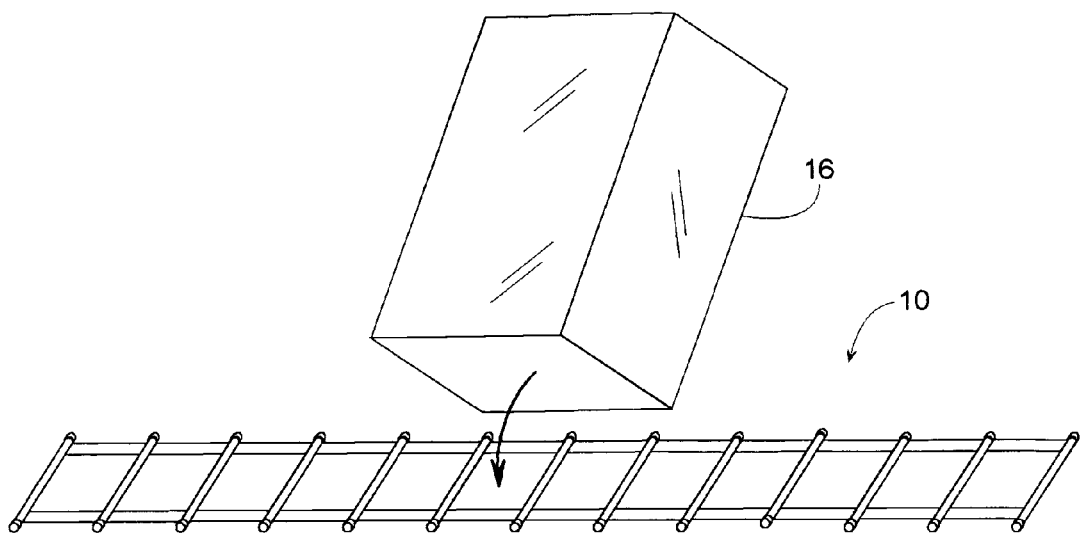
FIG. 2 is a perspective view showing the sling being inserted underneath a load by first tipping the load.
Figure 3:
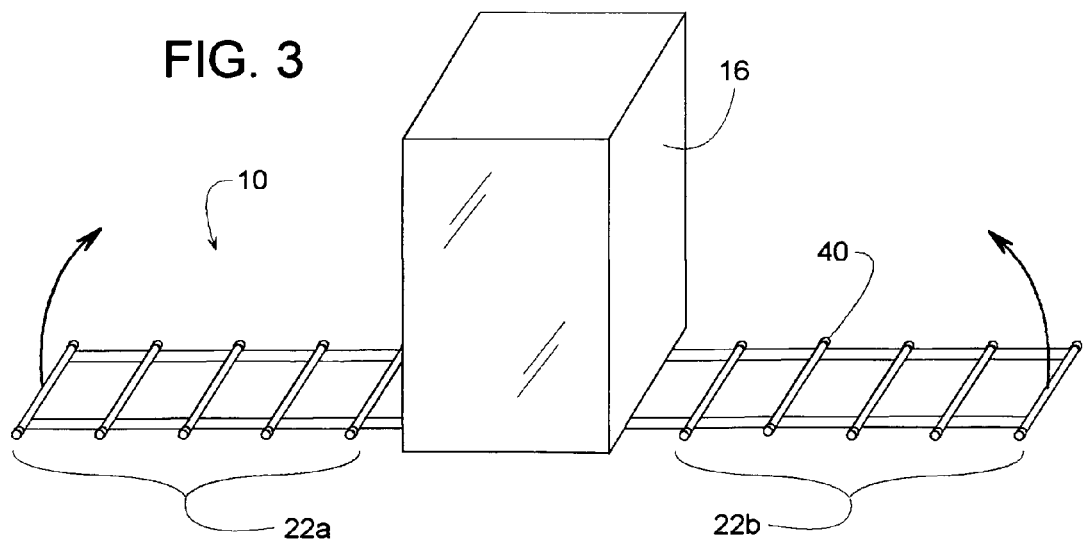
FIG. 3 is a perspective view showing the sling underneath the load with some handles underneath the load and other handles on either side of the load.

To carry load 16, one or more handles of sling 10 are placed underneath the load such that the load is situated between a first plurality of handles 22a and a second plurality of handles 22b. To do this, sling 10 can be slipped underneath the load as shown in FIG. 1, or the load may first need to be tipped as shown in FIG. 2. Once sling 10 is in position, first person 12 selects and grips a first handle 22c from the first plurality of handles 22a, and second person 14 selects and grips a second handle 22d from the second plurality of handles 22b such that persons 12 and 14 can comfortably lift the load. Sling 10 enables persons 12 and 14 to face in the same forward direction as they carry load 16, as shown in FIGS. 4 and 5. Moreover, each person only needs one arm for carry the load, so the person's other arm can be used for steadying the load or opening a door 24, as shown in FIG. 5.

Figure 6:
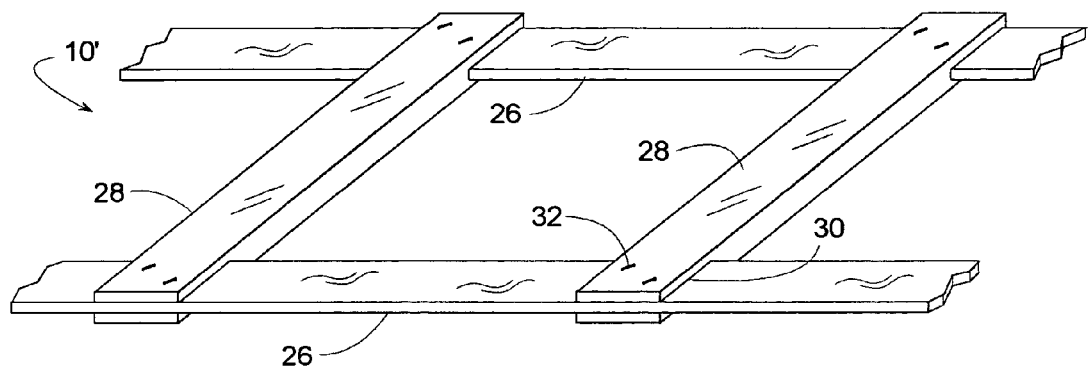
FIG. 6 is a perspective view of the sling according to one embodiment of the invention.

The actual construction of sling 10 may vary considerably while still keeping within the spirit of the invention. In FIG. 6, for example, a sling 10' comprises two parallel nylon straps 26 (pliable elongate members) and a series of handles 28 that lie perpendicular to straps 26. Handles 28 can be of any shape and material. Handles 28, for example, can be made of wood, plastic, or some other suitable material. Also, handles 28 can be hollow, solid, tubular, cylindrical (e.g., wooden dowels), rectangular, etc. At opposite ends of each handle 28 is a slit 30 for inserting straps 26. Handles 28 can be attached to straps 26 by any suitable method or structure including, but not limited to, staples 32, screws, pins, nails, glue, friction, stitches, wedge, clip, clamp, binder, knot, etc. When using a fastener, such as staples 32, the fastener preferably penetrates handle 28 and strap 26. Further enhancements of sling 10' could include encasing handles 28 within a dip-coating, sleeve, or tube, and the ends of handles 28 could be capped (see item 40 of FIG. 7) or dip-coated.

Figure 7:
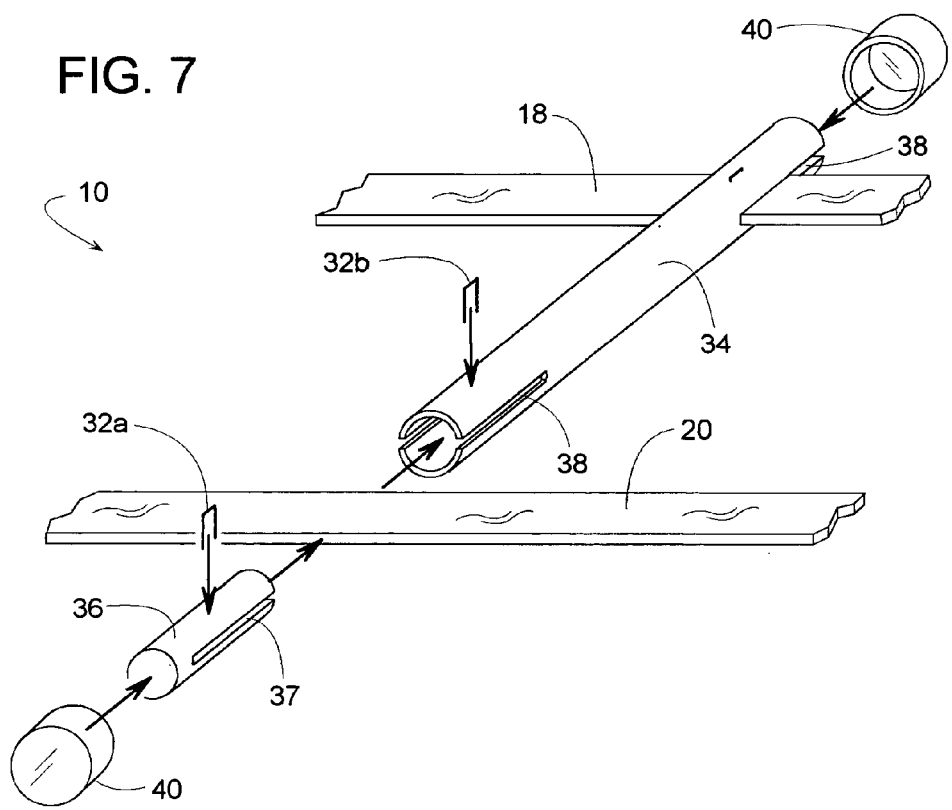
FIG. 7 is an exploded view of the sling according to another embodiment of the invention.
Figure 8:
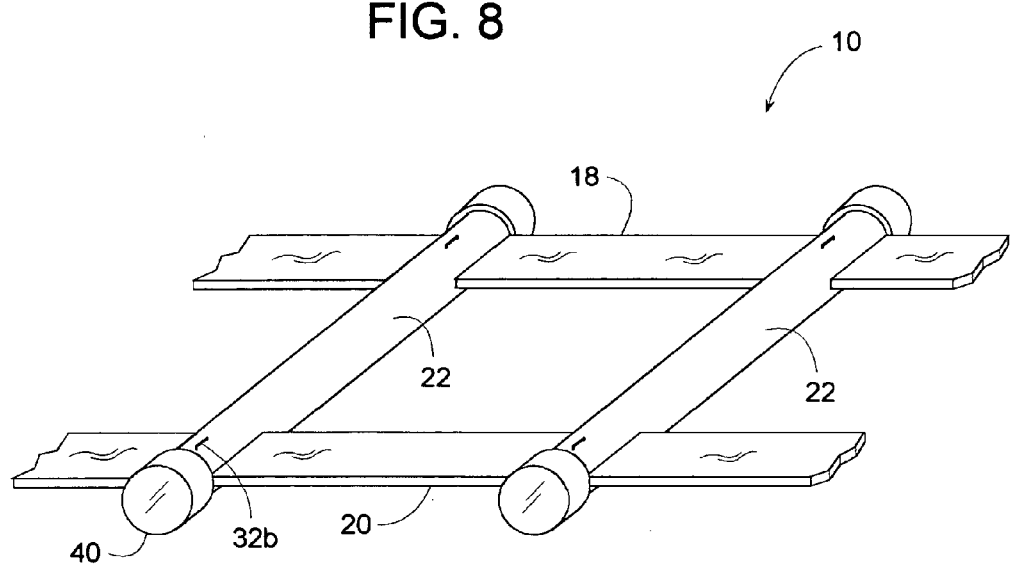
FIG. 8 is a perspective view of the sling shown in FIG. 7.

In another embodiment, shown in FIGS. 7 and 8, sling 10 includes a series of handles 22, wherein each handle 22 is an assembly of parts. In this case, each handle 22 comprises a tube 34 made of an appropriate material (e.g., fiberglass or some other plastic material, metal, rubber, or various combinations thereof). To attach straps 18 and 20 to handles 22, a series of wooden dowels 36 can be fastened to straps 18 and 20 in a manner similar to that of attaching handles 28 to straps 26. Strap 20, for example, can be inserted into a slit 37 of dowel 36 and a staple 32a can fasten strap 20 to dowel 36. With dowels 36 attached, straps 18 and 20 and dowels 36 are inserted into slits 38 at opposite ends of each tube 34. In some cases, staple 32a attaches strap 20 to dowel 32, which in turn is frictionally held within tube 32. Alternatively or in addition to staple 32a, a staple 32b interconnects tube 34, dowel 36 and strap 20. End caps 40 can be added to help hold strap 20 and dowels 36 to tubes 34 and/or perhaps improve the appearance of sling 10.

Figure 9:
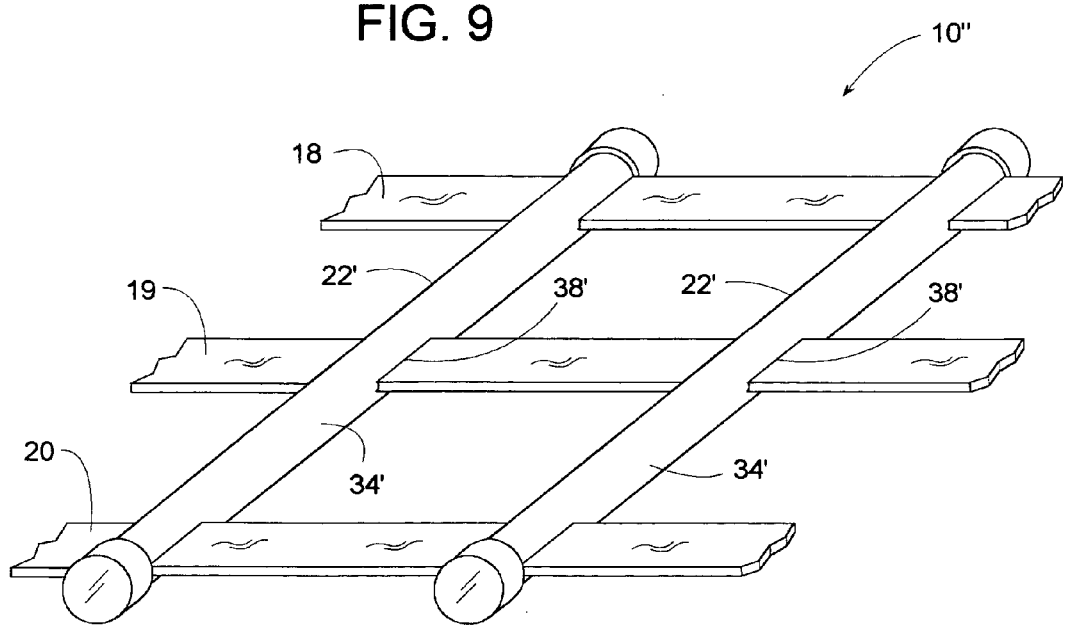
FIG. 9 is a perspective view of another sling embodiment.

For greater stability, a sling 10" can be made extra wide by using longer handles 22' as shown in FIG. 9. With an extra wide sling, additional slits 38' can be cut into each handle 22', and a central strap 19 can be inserted through each slit 38'. Opposite ends of central strap 19 can be anchored to the first and last handle of sling 10" by any suitable means. For example, an end of central strap 19 can be threaded through a tube handle 34' (the first or last one on the sling) and be stapled to one of the dowels 36 (FIG. 7) to which strap 20 is attached, whereby that dowel would then have the ends of two straps 19 and 20 stapled to it. Thus, a central dowel disposed in each tube handle would not be necessary. The construction of slings 10 and 10" is otherwise quite similar.

Although the invention is described with reference to a preferred embodiment, it should be appreciated by those of ordinary skill in the art that various modifications are well within the scope of the invention. Therefore, the scope of the invention is to be determined by reference to the following claims.

The invention claimed is:

1. A method for a first person and a second person to carry a load, wherein the method involves the use of a sling that comprises two pliable elongate members joined by a series of handles that are interposed therebetween, wherein the series of handles include a first plurality of handles and a second plurality of handles, and the series of handles are stiffer than the two pliable, elongate members, the method comprising:

extending the sling underneath the load such that the load is interposed between the first plurality of handles and the second plurality of handles;

selecting a first handle from the first plurality of handles;

gripping the first handle via the first person;

selecting a second handle from the second plurality of handles;

gripping the second handle via the second person such that the load is interposed between the first person and the second person; and manually lifting the load via the first person and the second person lifting the first handle and the second handle respectively, whereby the load is held cradled upon the sling between the first person and the second person.

2. The method of claim 1, wherein the first person and the second person both face in a forward direction.

3. The method of claim 2, wherein the load is farther forward than the second person and the first person is farther forward than the load as the load is being carried via the sling.

4. The method of claim 1, wherein the first person and the second person each have a first human arm and a second human arm, and the first person and the second person each use their first arm for lifting the load so that their second human arm is free for an other purpose.

5. The method of claim 4, wherein the other purpose involves opening a door.

6. The method of claim 4, wherein the other purpose involves steadying the load.

7. The method of claim 1, wherein the two pliable elongate members comprise two fabric straps.

8. The method of claim 1, wherein each handle of the series of handles lies substantially perpendicular to the two pliable elongate members.

9. The method of claim 1, wherein each handle of the series of handles defines two slits through which the two pliable elongate members extend.

10. The method of claim 1, further comprising positioning at least one handle of the series of handles underneath the load.

11. The method of claim 1, further comprising tipping the load so that the sling can be positioned underneath the load.

12. A method for a first person and a second person to carry a load, wherein the method involves the use of a sling that comprises two pliable elongate members joined by a series of handles that are interposed therebetween, wherein the series of handles include a first plurality of handles and a second plurality of handles, and the series of handles are stiffer than the two pliable, elongate members, the method comprising:

extending the sling underneath the load such that the load is interposed between the first plurality of handles and the second plurality of handles, wherein the two pliable elongate members comprise two fabric straps;

positioning at least one handle of the series of handles underneath the load;

selecting a first handle from the first plurality of handles, wherein the first plurality of handles are above a lower surface of the load;

gripping the first handle via the first person;

selecting a second handle from the second plurality of handles, wherein the second plurality of handles are above the lower surface of the load;

gripping the second handle via the second person such that the load is interposed between the first person and the second person; and manually lifting the load via the first person and the second person lifting the first handle and the second handle respectively, whereby the load is held cradled upon the sling between the first person and the second person.

13. The method of claim 12, wherein each handle of the series of handles lies substantially perpendicular to the two fabric straps.

14. The method of claim 12, wherein each handle of the series of handles defines two slits through which the two fabric straps extend.

15. The method of claim 12, further comprising using the series of handles for maintaining the two fabric straps in a spaced apart relationship.

* * * * *